Aug. 12, 1941.     E. H. TOWLE     2,252,051
ENGINE
Filed May 5, 1938
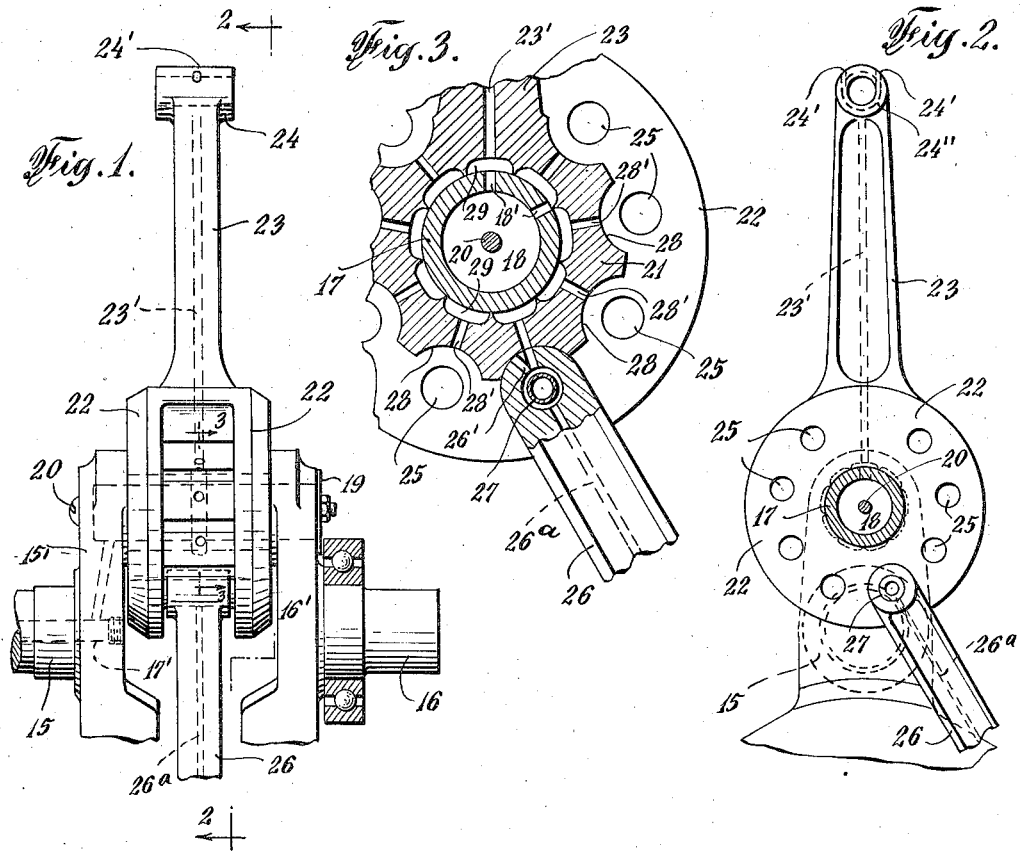
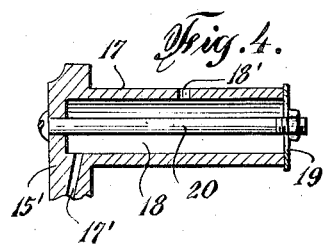
INVENTOR
E. H. Towle
BY John O. Seifert
ATTORNEY Patented Aug. 12, 1941

2,252,051

UNITED STATES PATENT OFFICE 2,252,051

ENGINE

Ellingwood H. Towle, Larchmont, N. Y.

Application May 5, 1938, Serial No. 206,136

7 Claims. (Cl. 184—6)

This invention relates to engines, particularly of the internal combustion type, and is applicable to single cylinder as well as multiple cylinder engines, and relates to the application of oil to the connections of the piston rod with the piston and crank pin of a crank shaft to lubricate such connections as well as to the walls of the piston to cool and maintain the piston parts, especially the top of the piston, substantially at a uniform temperature as disclosed in Letters Patent #1,881,149 granted to me October 4, 1932.

In internal combustion engines the heat of highest temperature is generated during the combustion of the fuel in the combustion space of the cylinder at the end or top of the piston near the center thereof with the result that the portions of the piston outwardly from the end are heated to a considerably lower temperature than the central portion of the piston. It is therefore important to reduce the temperature at the hottest point so that the temperature throughout the piston will be substantially uniform during the operation of the engine and so that there will be a more uniform expansion and contraction throughout the piston. This is effected by taking the oil from the crank case and dashing or spraying it against the central portion of the piston to lower the temperature of the piston at this point and bring it more nearly to the temperature of the other portions of the piston, and thus obviating the necessity of depending entirely upon cooling the engine by water or air usually employed for this purpose.

It is the object of the invention to provide an improved construction and arrangement of crank shaft and connections of a piston or pistons in oil circulation therewith to take oil from the crank case of the engine and apply the same to lubricate the crank pin of the shaft and the connections of the piston rod or rods thereto and to a piston, and particularly adapted for use in engines of V type and multiple radial cylinder types to supply a sufficient amount of oil to not only lubricate the parts but cool the piston and maintain the piston parts at a substantially uniform temperature.

In the use of the present invention it is possible to form the piston with a thinner wall both at the top and skirt than corresponding pistons now in general use, thereby facilitating dissipation of heat from the piston in addition to the advantage of reducing its weight; furthermore, it is possible to use a piston of ferris metal since it is possible to reduce the weight of the piston by the present invention to a point where it compares more favorably in regard to the weight factor with aluminum pistons, which is a desirable feature since iron pistons are advantageous over aluminum pistons except for the weight thereof.

The method of the present invention of circulating the oil through the piston rod connections with the crank pin and piston partly for cooling purposes insures a greater supply of oil at the wall of the cylinders than was possible with oiling systems of this character heretofore.

In internal combustion engines as heretofore constructed the oil is supplied to the under surface of the piston head in such small quantities that it is partly burned by the excessive heat of the piston head with the result that carbon particles accumulate on the under side of the piston head which wall into the oil in the crank case and are carried with the oil to the bearings where they tend to cut the bearings. This requires frequent renewal of the oil since otherwise the bearings will be injured by the grinding action of such carbon particles accumulated on the bearings. This is obviated by the present arrangement of the crank pin and connections of the piston rod thereto and the piston since there is assurance of a sufficient supply of oil being projected against the under side of the piston head to cool the same and thus prevent the piston head from being heated to such a high temperature that it will destructively affect the oil and create carbon particles even after operation of the engine over long periods of time. The above arrangement will also prevent the creation of smoke and fumes.

Other features and advantages of the invention will be set forth in the following detailed description of the embodiments of the invention illustrated.

In the drawing accompanying and forming part of this application—

Figure 1 is a front elevation of connecting means between the piston rods and the crank pin of a crank shaft to connect the pistons of a radial cylinder engine to the crank pin, and showing an embodiment of the invention, Figure 2 is a view taken on the line 2—2 of Figure 1 looking in the direction of the arrow, Figure 3 is an enlarged cross sectional detailed view of the mounting of a bearing on a hollow crank pin and in oil circulation therewith and to show the pivotal connection of one of the piston rods therewith, Figure 4 is a longitudinal sectional view of the crank pin of the shaft shown in Figures 1 to 3, Figure 5 is a side elevation of a knuckle pin to connect the piston rods to the bearing member mounted on the crank pin of the shaft.

An embodiment of the invention is shown in Figures 1, 2 and 3, applied to an engine of the radial cylinder type, only so much of the engine being shown as is essential to an understanding of the invention, and comprises a crank shaft, shown as axial separable sections, each arranged with a crank throw or arm 15', 16'; the crank arm 15' is provided with a crank or wrist pin 17 having a chamber 18 therein formed by a recess extended longitudinally into one end of the pin. The pin engages an opening in the crank arm 16' and the open end of the pin recess 18 is closed by a plate 19 secured in abutting relation to the end of the pin by a bolt or tie rod 20 which may also serve to secure the crank arms in alinement. The pin chamber constitutes a container for and is adapted to carry lubrication, such as oil, continuously supplied thereto through an inlet oil duct 17' leading from an oil supply and extended through the crank shaft 15 with a branch leading therefrom through the crank arm 15'. The chamber 18 is provided with a pair of oil outlet ports 18' opening through and predeterminedly circumferentially spaced about the lateral wall of the pin.

A bearing member 21 having an annular flange 22 at each end is journaled on the crank pin 17 and has a rod 23 connected thereto and shown as constructed integrally with the bearing member, the rod constituting a master piston rod having a bearing 24 at the end for the pivotal engagement of a wrist pin to connect a piston reciprocatory in a cylinder to the piston rod. An oil duct 23' extending longitudinally through the rod 23 communicates with a transverse or annular recess 24'' in the wall of the bore in the bearing 24, and ports 24' extended through the wall of the bearing 24 opposite the rod duct open to the recess 24'' in the wall of the bearing 24 at diametrically opposite sides thereof and are adapted for the delivery of oil therethrough from the recess 24''. The bearing is shown for the connecting of nine piston rods thereto disposed about the crank pin 17, the rod 23 serving to connect a piston reciprocatory in one cylinder to the crank pin and means are provided to pivotally connect the piston rods of the remaining pistons to the crank pin. For this purpose the bearing flanges 22 are provided with alined openings 25 equidistantly spaced from opposite sides of the piston rod 23. Piston connecting rods 26 are connected to the bearing flanges by tubular knuckle pins 27 extended through an opening in the end of the rods and mounted at the opposite ends in openings 25 in the bearing flanges, the knuckle pins having an annular groove or recess 27' in communication with a pair of ports 26' extended through the end of the rods. The end of the rods is of arcuate form arranged concentric to the knuckle pin engaging openings in the rods. The arcuate ends of the rods engage and are adapted to have movement relative to the arcuate wall of recesses 28 in the outer surface of the bearing member, said recesses being arranged in radially spaced and concentric relation to the disk openings 25. Radial ports 28' extending through the wall of the arcuate recesses 28 are adapted to register at one end with one or the other of the ports 26' in the arcuate end of the piston rods 26 and with recesses 29 in and spaced about the inner surface of the bearing in opposed relation to the arcuate recesses 28, one of said recesses being arranged relative to and communicating with the oil duct 23' in the rod 23. Each rod 26 is provided with a bearing similar to the bearing 24 of rod 23 for the engagement of a wrist pin to connect a piston to each rod, with the ports 24' in communication with the annular recess 24'' in the wall of the bearing, and provided with an oil duct 26ª in communication with the knuckle pin recess 27' and the recess 24'' in the bore in the bearing 24. Outlet ports 18' from the chamber 18 in the crank pin are spaced from each other a distance so that one of said ports is in communication with a bearing recess 29 in all positions of the crank pin. As shown in Figure 3 the one port 18' is in communication with the recess 29 communicating with the duct 23' in the rod 23, and the other port being in communication with the successive recess 29 to the right thereof, and the ports 18' by the rotation of the crank shafts are successively placed in communication with the successive recesses 29.

In operation the oil is forcibly fed through an inlet duct 17' to the chamber 18 in the crank pin 17 and delivered from said chamber through the ports 18' to the bearing recesses 29 and therefrom through the ports 28', 26' to the bearing of the piston rods 26 on the knuckle pins 27, and from said bearings the oil passes through the longitudinal duct in the piston rods to the bearing of the rod on the piston pin, and from said bearing the oil is forced through the ports 24' in a spray onto the inside of the piston head. The outlet ports 18' from the crank pin chamber 18 are arranged so that they will be moved successively into register with the bearing recesses 29 communicating with the oil duct in the piston rods during the compression and exhaust strokes of the pistons and during the period that the pistons are subjected to the high combustion temperatures in the combustion space at the end of the pistons in the cylinder, and whereby the oil will not only be supplied to the bearings of said piston rods but will also be delivered through the ports 24' in the piston rod bearings 24 and thereby splashed or sprayed onto the inside of the piston head and effecting cooling of the same. By the arrangement of the separating walls of the recesses 29 engaging the crank pin they serve to shut off the ports 18' from the crank pin chamber other than the recesses in communication with such ports and retain oil in said recesses, the oil ducts in the piston rods and the connections of the rods with the pistons and knuckle pins, whereby as the ports 18' are placed in communication with said recesses the oil in the oil ducts of the piston rods will be forced therefrom through the ports 24' and further oil supplied to the rod ducts.

Having described my invention, I claim:

1. In internal combustion engines, a crank shaft having a hollow crank pin with an oil inlet duct extended through the shaft in communication with the chamber in the crank pin, a bearing having an annular flange at each end journaled on the crank pin, said bearing having recesses spaced circumferentially about the inner surface with a port extending radially from each recess through the bearing wall, and the bearing flanges having alined openings arranged radially of said ports, knuckle pins mounted in the openings in and extending between the bearing flanges, and piston rods pivotally mounted on said knuckle pins between the bearing flanges, each rod having a port communicating with its pivotal mounting on the knuckle pin adapted to be placed in register with a radial port in the bearing, and said crank pin chamber having radial outlet ports predeterminedly circumferentially spaced about the same adapted by the rotation of the shaft to successively open communication between the chamber in the crank pin and mounting of the piston rods and maintain the crank pin chamber in communication with the pivot mounting of at least one piston rod at all times.

2. In internal combustion engines, a crank shaft having a hollow crank pin and an oil inlet duct extended through the crank shaft in communication with the chamber in the crank pin, a bearing journaled on the crank pin having an annular flange at each end, said bearing having recesses in and spaced circumferentially about the inner surface thereof and arcuate recesses in the outer surface opposed to the inner recesses with ports extending radially through the recess walls midway the ends of the recesses, alined openings spaced about the bearing flanges in radial alinement with the bearing ports and concentric of the outer recesses, knuckle pins mounted in alined openings in the bearing flanges, and piston rods pivotally mounted on said pins having the ends made in arcuate form engaging in the outer arcuate recesses in the bearing, and each rod having a port through the arcuate end in communication with the mounting of the rods on the knuckle pins adapted to be placed in communication with the bearing ports, and said crank pin chamber having a pair of predeterminedly circumferentially spaced radial outlet ports adapted by the rotation of the shaft to connect the chamber in the crank pin successively to the piston rod ports in communication with the piston rod mounting on the knuckle pins and maintain communication with at least one piston rod mounting at all times.

3. In internal combustion engines, a crank shaft having a hollow crank pin and an inlet oil duct in communication with the chamber in the pin, a bearing journaled on the crank pin having recesses in and circumferentially spaced about the inner surface, and arcuate recesses in the outer surface of the bearing in opposed relation to the inner recesses with ports extending radially through the wall of each of said recesses, intermediate the ends thereof, and said bearing having annular flanges at the opposite ends arranged with alined openings radially of the recess connecting ports and concentric of the outer arcuate recesses in the bearing, knuckle pins mounted at the opposite ends in alined openings and extending between the flanges, piston rods pivotally mounted on said knuckle pins, said rods having an arcuate end to engage the outer arcuate recesses in the bearing and ports through the arcuate end in communication with the mounting of the rods on the knuckle pins and adapted to be placed in communication with the bearing ports, and outlet ports predeterminedly circumferentially spaced about and extending radially through the wall of the crank pin chamber adapted by the rotation of the crank shaft to successively place said crank pin chamber in communication with the inner recesses of the bearing and maintain the crank chamber at all times in communication with at least one of said recesses.

4. In internal combustion engines, a crank shaft having a hollow crank pin and an oil inlet duct extended therethrough in communication with the chamber in the crank pin, a bearing on the crank pin having a flange at each end, and the flanges having alined openings equidistantly spaced about the flanges, said bearing member having arcuate recesses in the outer face in concentric spaced relation to the flange openings and ports opening through the wall of the bearing member midway the ends of said recesses, knuckle pins mounted at the ends in opposed openings in the bearing flanges, piston rods pivoted on the knuckle pins, each rod having the end made in arcuate form corresponding to and engaging in an arcuate recess in the bearing, ports through said end of the piston rods in communication with the ports in the bearing recesses, and radial outlet ports in and predeterminedly spaced about the wall of the crank pin chamber adapted by the rotation of the crank shaft to successively connect the crank pin chamber with the piston rod connections through the ports in the bearing member.

5. Internal combustion engines as claimed in claim 4, wherein each piston rod is arranged with a piston pin engaging bearing at the outer end having an annular recess in the bearing face in communication with a duct extending longitudinally through the rod and ports opening through the wall of the bearing opposite the duct in the piston rod, the knuckle pins having an annular recess in communication with the rod ducts and ports through the arcuate ends of the piston rods, and the outlet port from the crank pin chamber adapted to be placed in communication with the bearing ports and mountings of the piston rods during the compression and exhaust strokes of the engine pistons.

6. In internal combustion engines, a crank shaft having a crank pin arranged with a chamber therein and an oil inlet duct extending through the crank shaft in communication with the crank pin chamber and the crank pin chamber having radial outlet ports predeterminedly circumferentially spaced about the same, a bearing member arranged with an integral radially extending piston rod, having a duct extending longitudinally therethrough and said bearing member mounted on the crank pin and having recesses in the bearing face on the crank pin with one recess disposed relative to and in communication with the duct in the piston rod, radial ports in the bearing member midway the ends of the recesses, piston rods pivotally mounted on the bearing member in radial alinement with the recess ports, said piston rods having ducts extending longitudinally therethrough in communication with the piston rod bearings and ports extending through the ends from the pivotal mounting thereof adapted to be connected in communication with the recess ports, and the outlet ports of the crank pin chamber by the rotation of the shaft adapted to be successively connected in communication with the bearing recesses and the ports of said recesses with the piston rod ports during the compression and exhaust strokes of the engine pistons.

7. In internal combustion engines, a crank shaft having a hollow crank pin and an oil duct in communication with the crank pin chamber, a master piston rod arranged with a bearing member at one end engaged on the crank pin and having a duct extending longitudinally therethrough and the wall of the bearing member, said bearing member arranged with an annular flange at each end having openings equidistantly spaced about the flanges at opposite sides of said master piston rod and arcuate recesses in the outer face concentrically of the flange openings, ports opening through the wall of the bearing member midway the ends of said recesses, knuckle pins having an annular recess in the outer surface midway the ends mounted in opposed openings in the flanges of the bearing member, piston rods having an opening at one end for the pivotal engagement of a knuckle pin and having an oil duct extending longitudinally through the rods opening to said knuckle recesses, and said end of each rod made in arcuate form conforming to and engaging in an arcuate recess in the bearing member and having ports extended through the arcuate end of the piston rods opening to the recess in the knuckle pins adapted by the rotation of the crank shaft to be placed into and out of communication with the ports in the bearing recesses, and radial outlet ports predeterminedly circumferentially spaced about the wall of the crank pin chamber adapted by the rotation of the crank shaft to successively connect the crank pin chamber through said outlet ports and the ports in the bearing member with the duct in the master piston rod and the bearings of the piston rods on the knuckle pins and the oil ducts in said piston rods.

ELLINGWOOD H. TOWLE.